(12) United States Patent
Mitchell, Jr.

(10) Patent No.: US 7,165,382 B2
(45) Date of Patent: Jan. 23, 2007

(54) TRIMMER ATTACHMENT FOR LAWN MOWERS AND TRACTORS

(76) Inventor: James D. Mitchell, Jr., P.O. Box 56, Eden, NC (US) 27288

( * ) Notice: Subject to any disclaimer, the term of this patent is extended or adjusted under 35 U.S.C. 154(b) by 716 days.

(21) Appl. No.: 09/825,176

(22) Filed: Apr. 3, 2001

(65) Prior Publication Data

US 2002/0174635 A1 Nov. 28, 2002

Related U.S. Application Data

(60) Provisional application No. 60/217,807, filed on Jul. 12, 2000.

(51) Int. Cl.
*A01D 34/84* (2006.01)
(52) U.S. Cl. ........................ 56/12.7; 56/13.6
(58) Field of Classification Search .......... 56/12.7, 56/13.6, 14.9, 15.5, 15.7, 15.8, 15.9, 17.1, 56/17.5, DIG. 9
See application file for complete search history.

(56) References Cited

U.S. PATENT DOCUMENTS

| | | | |
|---|---|---|---|
| 4,170,099 A | 10/1979 | Owens | |
| 4,629,006 A | 12/1986 | Mullet et al. | |
| 4,663,920 A * | 5/1987 | Skovhoj | 56/12.7 |
| 4,949,534 A * | 8/1990 | Evans | 56/13.8 |
| 5,040,360 A * | 8/1991 | Meehleder | 56/11.6 |
| 5,179,823 A | 1/1993 | Pace | |
| 5,560,189 A | 10/1996 | Devillier et al. | |
| 6,094,896 A * | 8/2000 | Lane | 56/13.7 |

\* cited by examiner

*Primary Examiner*—Meredith C. Petravick

(57) ABSTRACT

An attachment for a lawn maintenance vehicle includes a trimming apparatus. The attachment allows vertical and horizontal movement of the trimming apparatus such that lawn areas which are not accessible to the lawn maintenance vehicle's cutting apparatus can be trimmed easily.

3 Claims, 9 Drawing Sheets

TRIMMER ATTACHMENT FOR LAWN MOWERS AND TRACTORS

CROSS REFERENCE TO RELATED APPLICATION

The present application claims priority from U.S. Provisional Application Ser. No. 60/217,807 filed Jul. 12, 2000.

BACKGROUND OF THE INVENTION

The present invention relates to devices for trimming lawns and more particularly to devices for trimming lawns which is used in conjunction with large mowers or tractors.

DESCRIPTION OF THE RELATED ART

Lawnmowers are currently unable to trim the edges of lawns or locations which are close to objects commonly found in or near lawns such as trees, fences, houses, mailboxes, etc. It is well known to use a separate device known as a trimmer or edger to complete the cutting of these troublesome areas once the lawn has been completely cut. This extra effort significantly increases the time spent on lawn care.

Previous methods for solving this problem are known. One such apparatus is shown in U.S. Pat. No. 5,179,823 which shows a push lawn mower with an edger attachment. This attachment includes a vertical blade which can be implemented to cut the edge of a lawn, for example, where the edge of the lawn meets a side walk or drive way. This device does not trim the lawn.

U.S. Pat. No. 4,170,099 shows an attachment for a power mower which pivots about a point on the mower. In its completely raised position, i.e., vertical with the trimmer apparatus facing up, the trimmer is disengaged. The attachment can be lowered to a horizontal position such that the trimmer apparatus acts to edge the lawn. Finally, in its completely lowered position, i.e., vertical with the trimmer apparatus facing down, the trimmer is engaged as a trimmer. In this position, the trimmer cuts grass immediately next to the mower. This apparatus has several deficiencies, particularly in that it does not allow areas distant from the mower to be trimmed. Further, it does not allow for vertical movement of the trimmer during use.

U.S. Pat. No. 4,629,006 shows a lawn edger attachment for tractors. This device includes a vertical blade for edging between a grass-pavement interface. The vertical blade is raised when not in use. When lawn edging is to be accomplished, the tractor is lined up with the grass-pavement interface and the blade is lowered to the appropriate vertical depth. A foot pedal allows the user to force the blade edge below the surface and the blade is then locked in to that vertical depth.

Another such device is shown in U.S. Pat. No. 5,560,189 which shows a combination mower/trimmer/edger assembly. This device includes a blade rotating in the horizontal direction for cutting grass, a trimmer extending from the mower for trimming grass and a vertical blade extending from the mower for edging. The trimming means is fixedly mounted to the mower and is not adjustable in the horizontal or vertical direction. The edging means is fixedly mounted to the mower and is vertically adjustable to allow the blade to reach the appropriate vertical depth and then the blade is locked in to maintain that depth.

SUMMARY OF THE INVENTION

A trimmer attachment assembly for a lawn maintenance vehicle is described. The attachment includes a frame member which is removably connectable to the vehicle, a pivot arm which is connected to the frame member at a pivot point, preferably by a pivot pin, a trimmer which is attached to the opposite end of the pivot arm from the frame member, apparatus for automatically adjusting the vertical height of the trimmer, and a control lever connected to the pivot arm. The frame member may be bolted to the vehicle or any other suitable connection means may be used. Further, the frame member may be an integral part of the vehicle. The trimmer may be powered by electricity, hydraulics or mechanically. Preferably the diameter of the trimmer area reached by the trimmer extends beyond the diameter of the trimmer and motor allowing a larger area and difficult locations to be trimmed. The control lever connected to the pivot arm can be constructed to be controlled by hand or by foot and preferably is connected to the pivot arm by means of a connecting rod. In a particularly preferred embodiment, the pivot arm is divided into two portions which are connected such that the portion of the pivot arm to which the trimmer is attached can automatically pivot in the vertical direction as needed. This connection may be made by one or more pivot members and preferably is made by four horizontal pivot members. An adjustable counterbalance means, such as a spring, is preferably connected to at least one pivot member to control the vertical movement of the trimmer. If multiple pivot members are used, the ends of the pivot members may be connected for stability.

An object of the invention is to provide an attachment assembly for trimming lawns.

Another object of the invention is to provide an attachment assembly for trimming lawns which can be attached to large mowers, riding mowers or lawn tractors.

Yet another object of the invention is to provide an attachment assembly for trimming lawns which adjusts vertically and horizontally to enable complete trimming.

A further object of the invention is to provide an attachment assembly for trimming lawns which is inexpensive to manufacture.

Finally, it is an object of the present invention to accomplish the foregoing objectives in a simple and cost effective manner.

Figure 1:
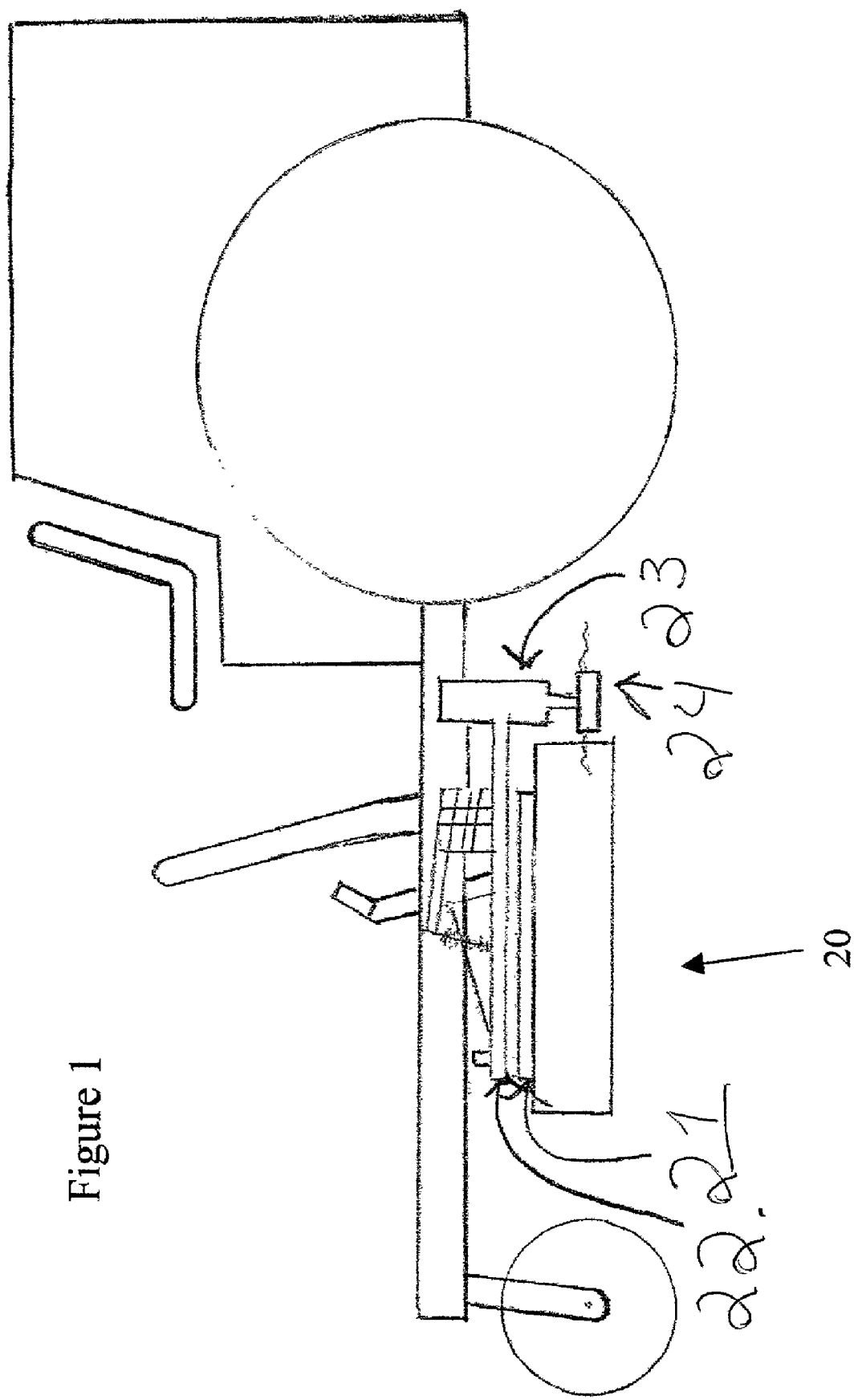
FIG. 1 is a side view of the present invention mounted on a zero radius turn riding lawnmower.
Figure 2:
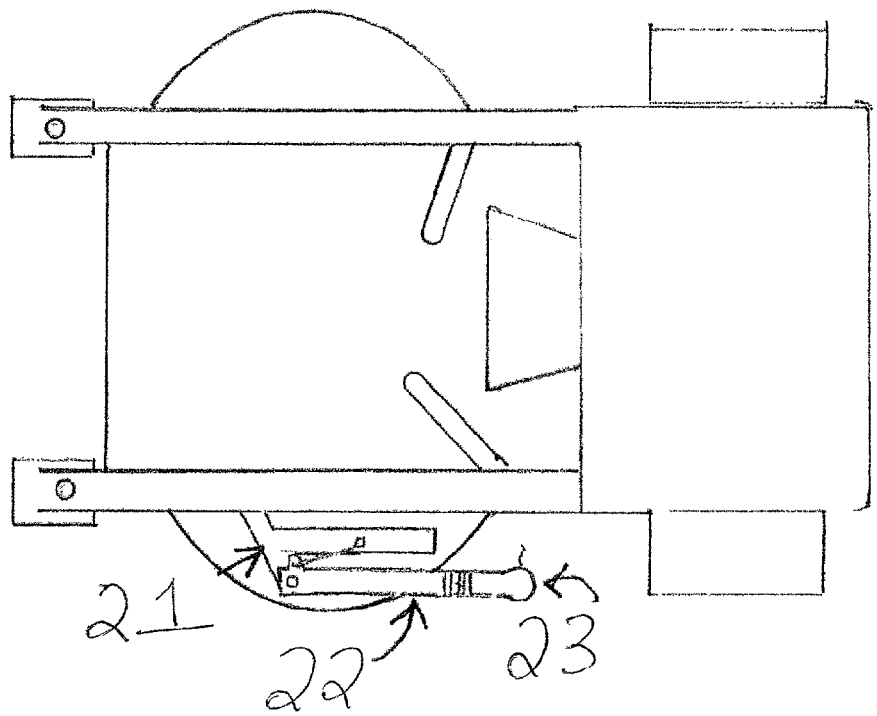
FIG. 2 is a top view of the present invention mounted on a zero radius turn riding lawn mower.
Figure 4:
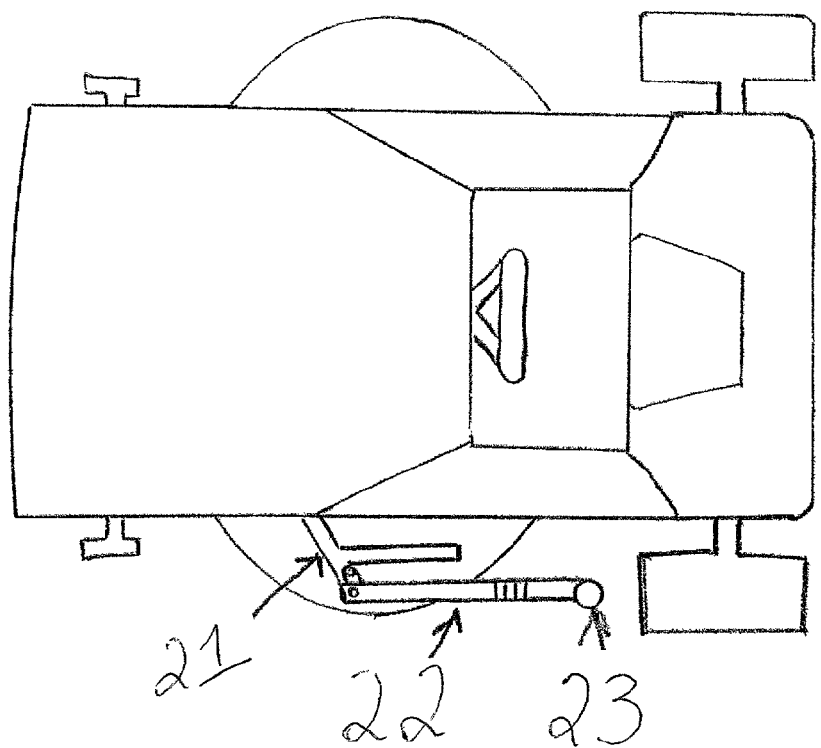
FIG. 4 is a top view of the present invention mounted on a conventional riding lawnmower.
Figure 3:
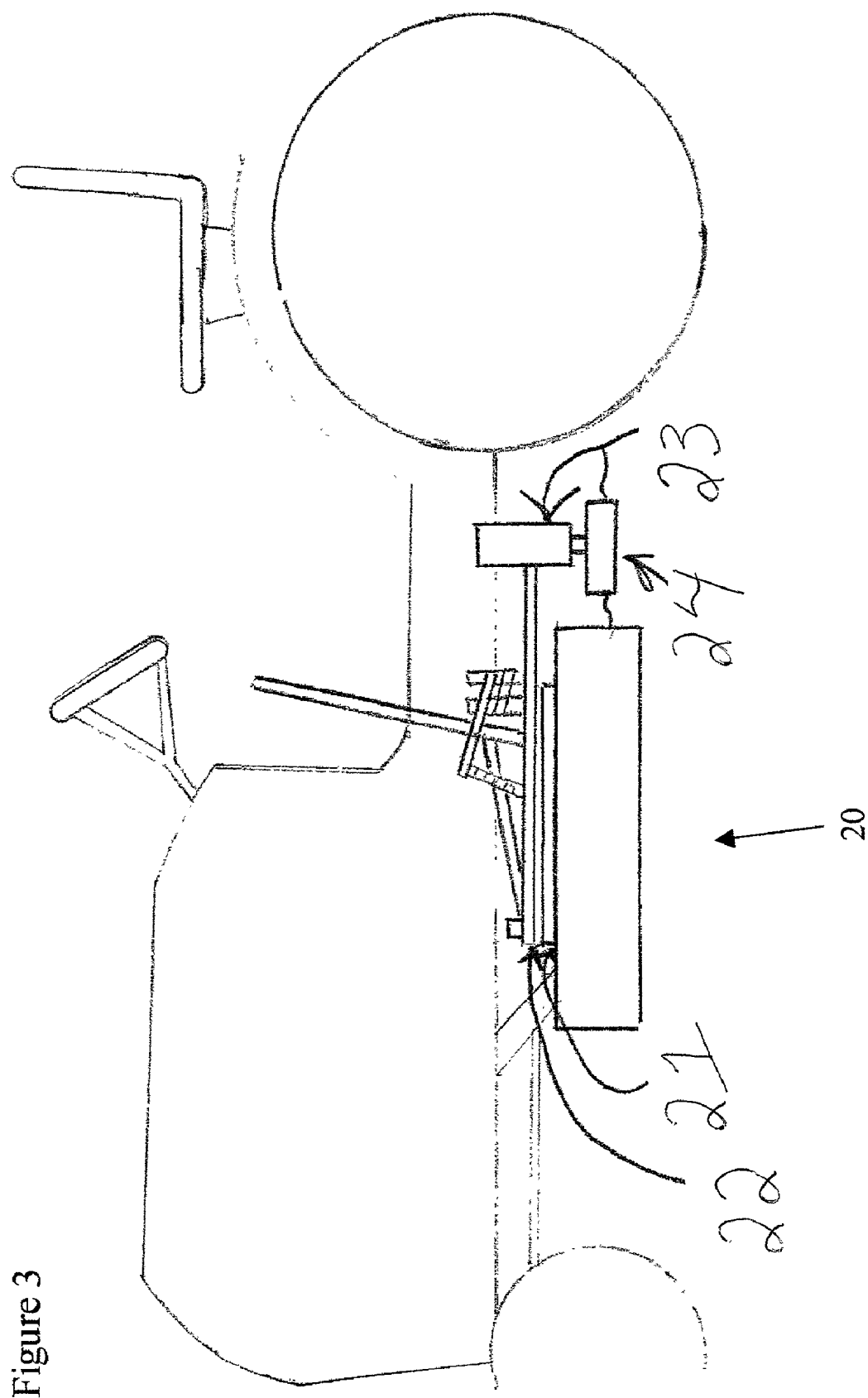
FIG. 3 is a side view of the present invention mounted on a conventional riding mower.

Element List 20 trimmer attachment
21 frame member
22 pivot arm assembly
23 motor
24 trimming means
25 front half of pivot arm assembly (which attaches to the frame member)
26 back half of pivot arm assembly (which attaches to motorized trimming means)
27 spring
28 threaded eyebolt
29 upper pivot members
30 plate
31 lower pivot members
32 pins
33 shaft bolt
34 spool housing
35 spool
36 spring
37 retaining nut
38 bottom ring
39 top ring
40 connecting stud
41 screws
42 teeth
43 holes
44 hole
45 hole
46 pin
47 connecting rod or cable
48 foot operated control lever
49 hand operated control lever
50 connection point
51 striking plate
52 shaft
53 shaft guide
54 solenoid
55 spring
56 automatic feed rod
57 automatic feed rod guide

DETAILED DESCRIPTION OF THE PREFERRED EMBODIMENT

The following detailed description is of the best presently contemplated mode of carrying out the invention. This description is not to be taken in a limiting sense, but is made merely for the purpose of illustrating general principles of embodiments of the invention. Specifically, alternate frame designs, alternate pivot arm assemblies, alternate trimmer types including those which do not use a line feeding mechanism, and alternate methods of feeding line are contemplated and considered to be within the scope of the claims set forth herein.

The applicant has devised a device which can be mounted on existing lawn maintenance vehicles such as large mowers, riding mowers and tractors so that an operator can trim a lawn simultaneously along with cutting the lawn. The device includes a frame member for mounting onto an existing vehicle, a motorized trimming component and a pivot arm assembly which allows the trimming component to automatically move in the vertical direction to compensate for variations in the landscape. Further, the pivot arm assembly includes a control lever which allows for lateral movement of the trimming component such that all areas of a lawn can be reached and trimmed from the vehicle. While the attachment is shown and described below as a device which can be retrofit to existing vehicles, it is clearly within the scope of this invention for the device to be included as standard on new vehicles.

Referring to FIGS. 1–4, a preferred embodiment of the present invention is shown generally by the number 20. The attachment 20 consists primarily of a frame member 21, a pivot arm assembly 22, a motor 23 and a trimming means 24. The attachment 20 is shown mounted on two different types of riding lawn mowers but may also be attached to large lawn mowers, tractors and other types of vehicles used for lawn maintenance. The design of the frame member 21 will differ depending on the vehicle on which the attachment 20 will be mounted. The pivot arm assembly 22 allows the motorized trimming means 23 and 24 to pivot in the vertical direction. Power to the motor 23 is controlled by the operator, preferably by a switch within easy reach of the operator, and can be electrically, hydraulically or mechanically driven.

Figure 5:
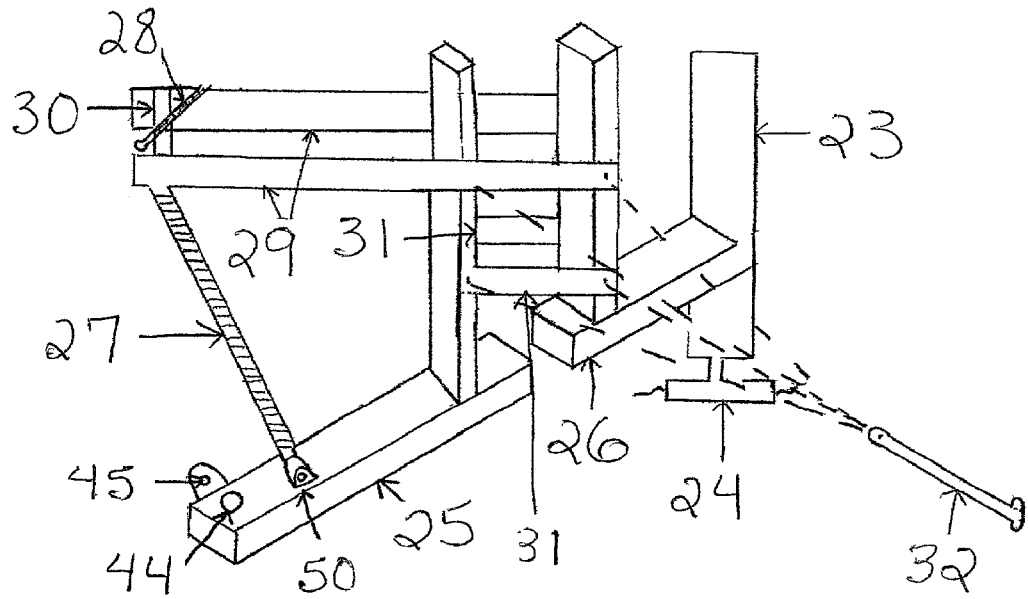
FIG. 5 is a side elevational view of the pivot arm assembly and motorized trimming means of the present invention.
Figure 6:
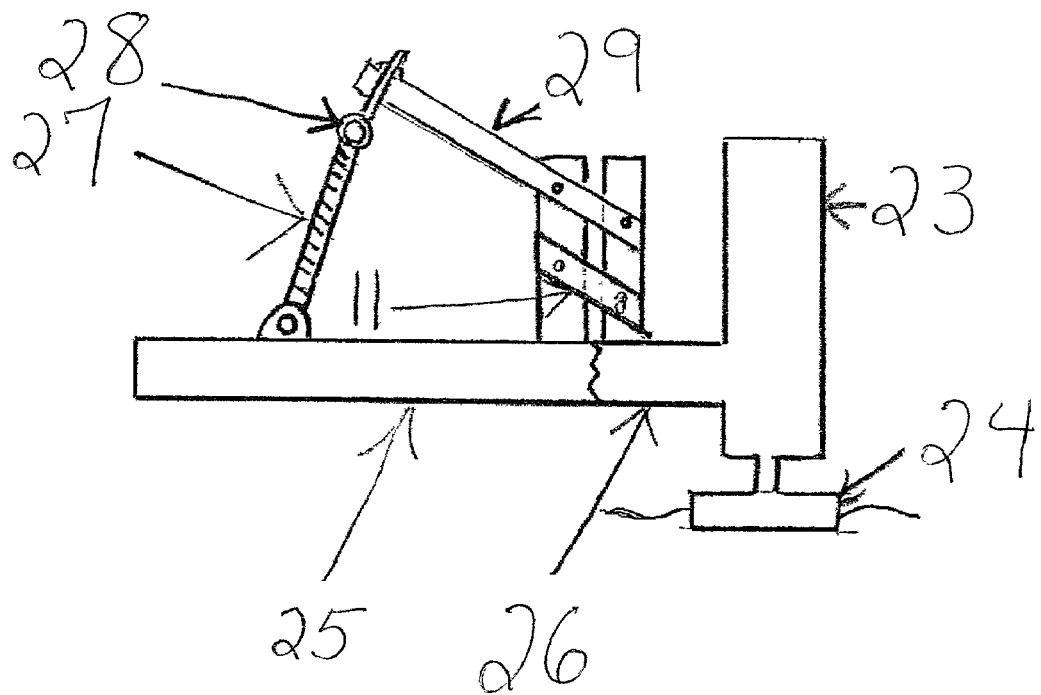
FIG. 6 is a side view of the pivot arm assembly and motorized trimming means of the present invention.

The preferred pivot arm assembly 22 is shown in more detail in FIGS. 5 and 6. The pivot arm assembly 22 includes two major portions, a front segment 25 and a rear segment 26. The front segment 25 attaches to the frame member 21 by means of a hole 44 which accepts a pin 46 (shown in FIG. 10). The motorized trimming means (23 and 24) is mounted to the rear segment 26. The front segment 25 and rear segment 26 of the pivot arm assembly 22 have horizontal portions and vertical portions and are connected to each other by upper 29 and lower 31 pivot members. The lower pivot members 31 are connected at their ends to the vertical portions of the front 25 and rear 26 segments using pivot pins 32 in such a manner as to allow pivoting movement about the pins 32. The upper pivot members 29 are connected at one end to the vertical portion of the rear segment 26 of the pivot arm assembly 22. The opposite ends of the upper pivot members 29 extend beyond the vertical portion of the front segment 25 of the pivot arm assembly 22 and are connected by a plate 30. These ends of the upper pivot members 29 are also connected to one end of a spring 27 by means of eyebolt 28, while the other end of the spring 27 is connected to the front segment 25 of the pivot arm assembly 22. The spring 27 can be adjusted using eyebolt 28. The upper pivot members 29 are also connected to the vertical portion of front segment 25 such that the upper 29 and lower 31 pivot members are substantially parallel to each other. This connection is again made with pins 32 such that movement about the pins 32 can be accomplished.

Figure 7:
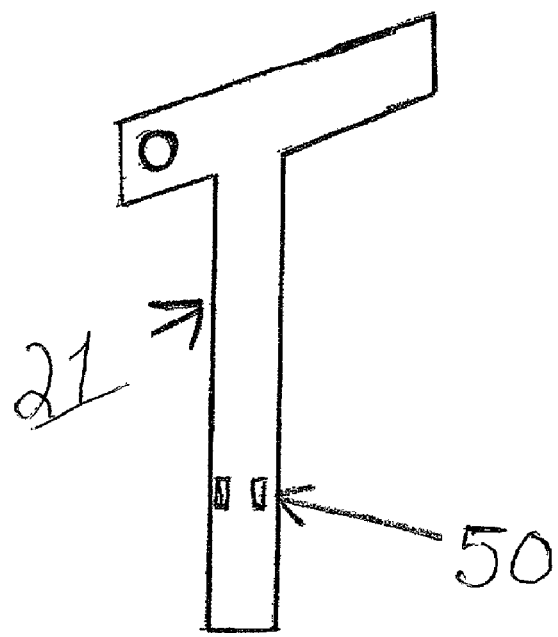
FIG. 7 is a top view of the frame member of the present invention.
Figure 8:
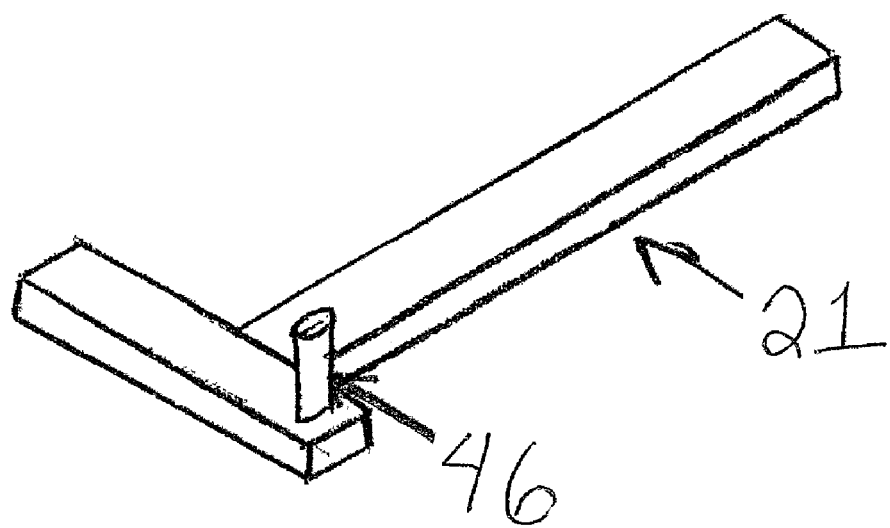
FIG. 8 is an elevational view of the frame member of the present invention.
Figure 9:
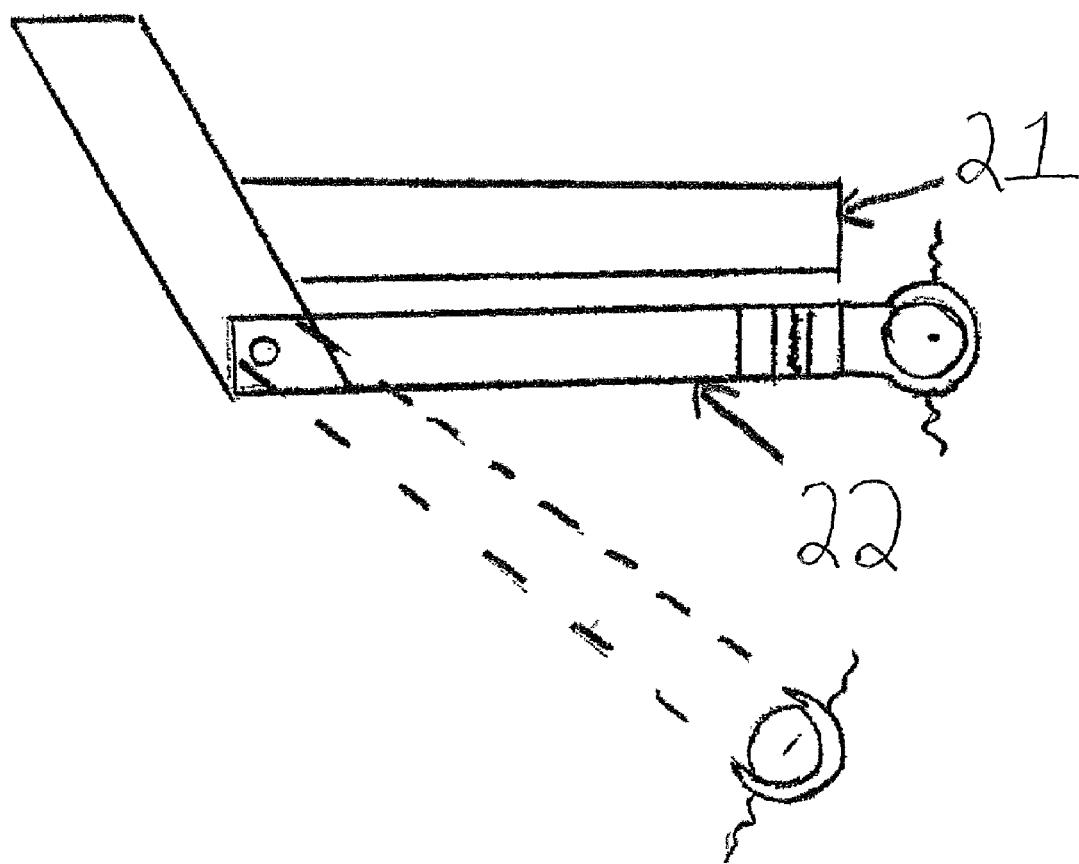
FIG. 9 is a top view of the frame member and the pivot arm assembly of the present invention.
Figure 10:
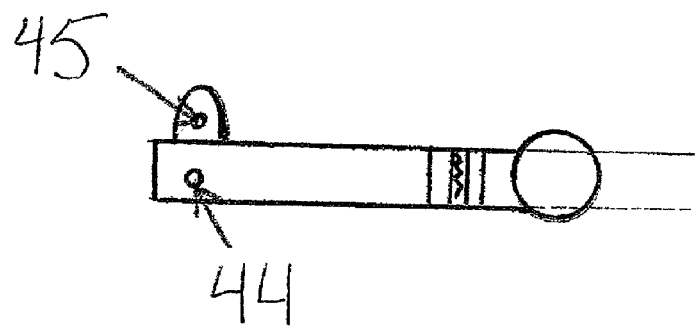
FIG. 10 is a top view of the pivot arm assembly of the present invention.

FIGS. 7 and 8 show the frame member 21 including pin 46 and an attachment point 50 where a control lever 48 or 49 (shown in FIGS. 11 and 12) attaches to the frame member 21. FIG. 9 shows the pivoting action of the pivot arm assembly 22 as it pivots with respect to the frame member 21. FIG. 10 shows the pivot arm assembly 22 including the hole 44 which accepts the pin 46 (shown in FIG. 8) on the frame member 21 and the attachment point 45 for the connecting rod or cable 47 (shown in FIGS. 11 and 12).

Figure 11:
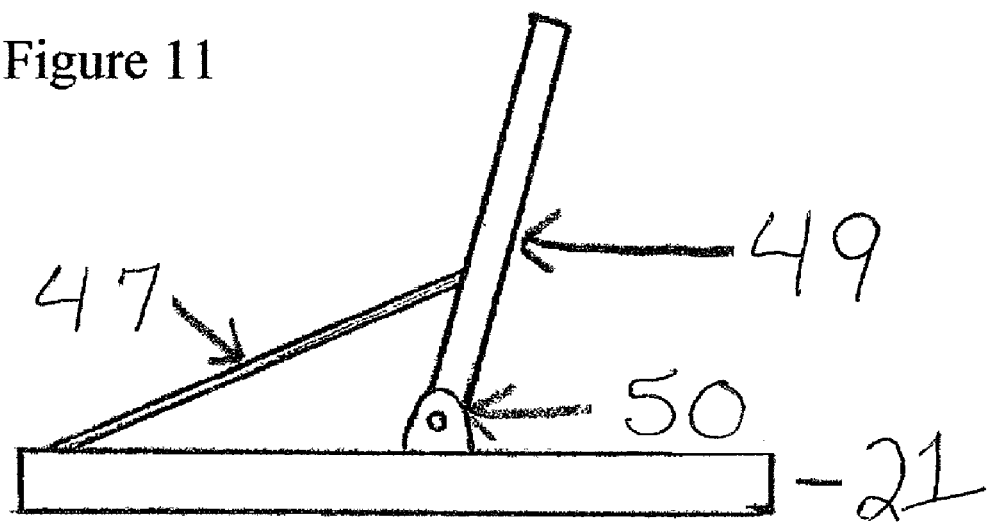
FIG. 11 is a side view of a hand-controlled lever as contemplated by the present invention.

FIG. 11 shows the present invention with a hand control lever 49. The hand control lever 49 is connected to the attachment point 50 on the frame member 21 so that the hand control lever 49 has movement back and forth, but not sideways. The connecting rod or cable 47 is connected to the hand control lever 49 on one end and the other end is connected to the attachment point 45 on the pivot arm assembly 22. Movement of this hand control lever 49 transfers to lateral movement of the pivot arm assembly 22.

Figure 12:
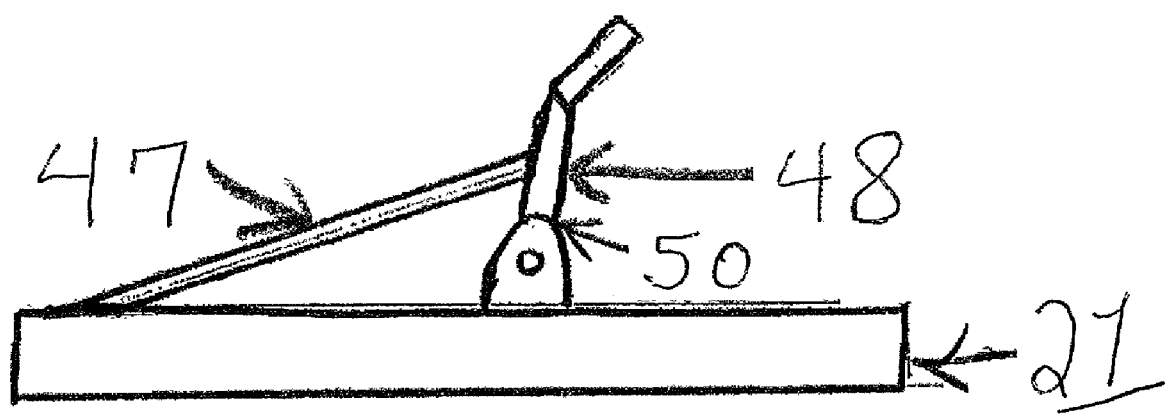
FIG. 12 is a side view of a foot-controlled lever as contemplated by the present invention.

An alternate embodiment employing a foot control lever is shown in FIG. 12. Again, the control lever 48 is connected to the attachment point 50 on the frame member 21 so that the control lever 48 has movement back and forth, but not sideways. The connecting rod or cable 47 is connected to foot control lever 48 on one end and the other end is connected to the attachment point 45 on the pivot arm assembly 22. Again, movement of the foot control lever 48 transfers into lateral movement of the pivot arm assembly 22.

Figure 13:
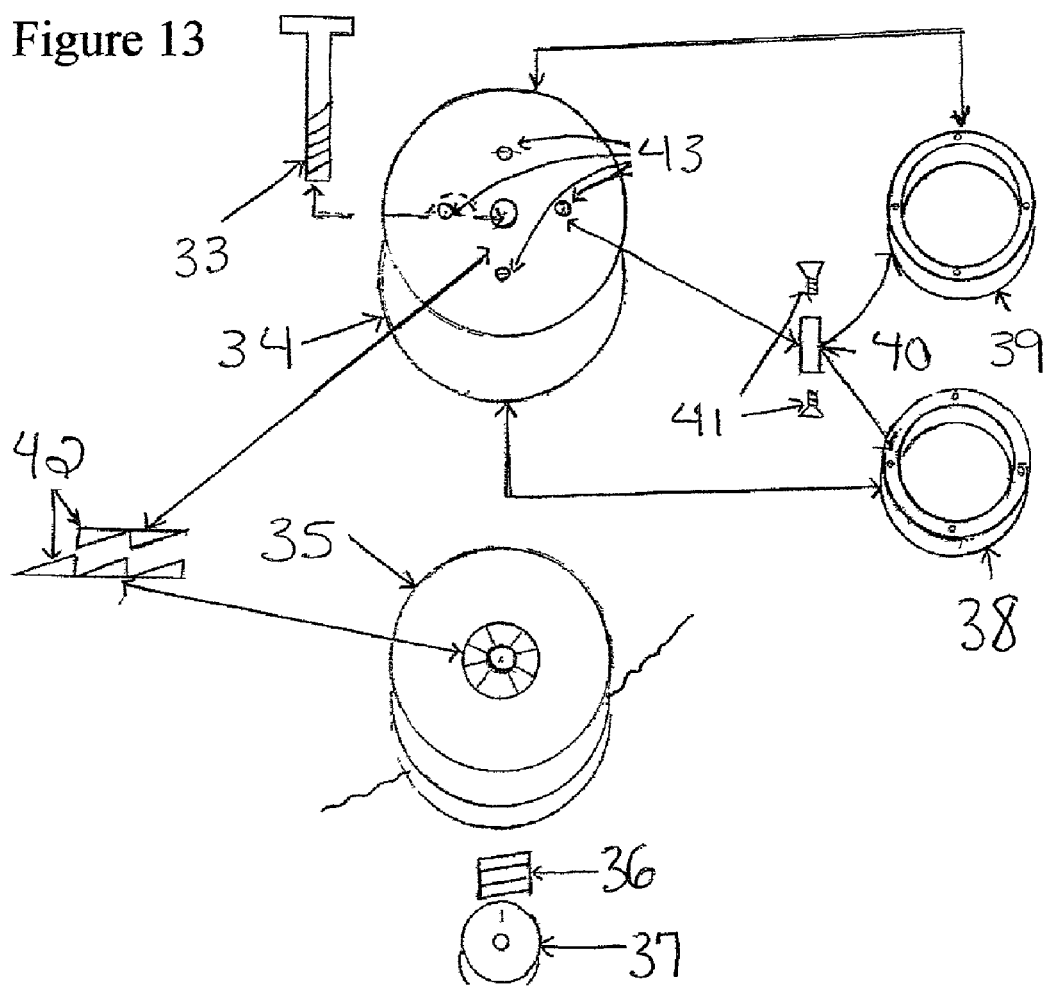
FIG. 13 is an exploded view of the self-feeding head of the present invention.
Figure 14:
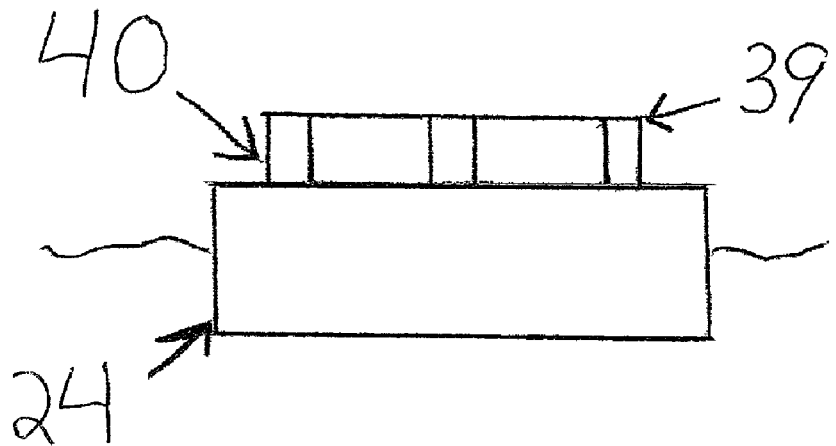
FIG. 14 is a side view of automatic feeding head of the present invention.

FIG. 13 shows one possible assembly for remotely feeding line from a trimming apparatus which makes use of feedable line for trimming. Because the operator of the trimming attachment 20 is located remote from the motorized trimming apparatus 23 and 24 and because most auto feed machines today are operated by impacting the bottom of the tool against the ground, it is preferable to modify the trimmer 24 such that the line can be fed from a remote location. In this design, the trimming apparatus 24 consists of a spool housing 34, a spool 35, a top ring 39, a bottom ring 38 and a center shaft bolt 33. The spool 35 is placed inside the spool housing 34. The top ring 39, bottom ring 38 and upper surface of the spool housing 34 include a matching set of holes 43. A connecting stud 40 is placed in each hole 43 of the bottom ring 38 and a screw 41 is placed in each connecting stud 40. The bottom ring 38 is then placed on top of the spool 35 such that the connecting studs 40 extend through the bottom ring 38 and away from the spool 35 and such that the connecting studs 40 extends through the holes 43 in the upper surface of the spool housing 34. The holes 43 in the top ring 39 are then aligned with the connecting studs 40 and screws 41 are used to maintain the top ring 39 on the connecting studs 40. The center shaft bolt 33 then extends through the center of the top ring 39, a hole in the center of upper surface of the spool housing 34, the center of the bottom ring 38, the center of the spool 35 and then through a spring 36 and a retaining nut 37. FIG. 14 shows the assembled trimming means 24.

Figure 15:
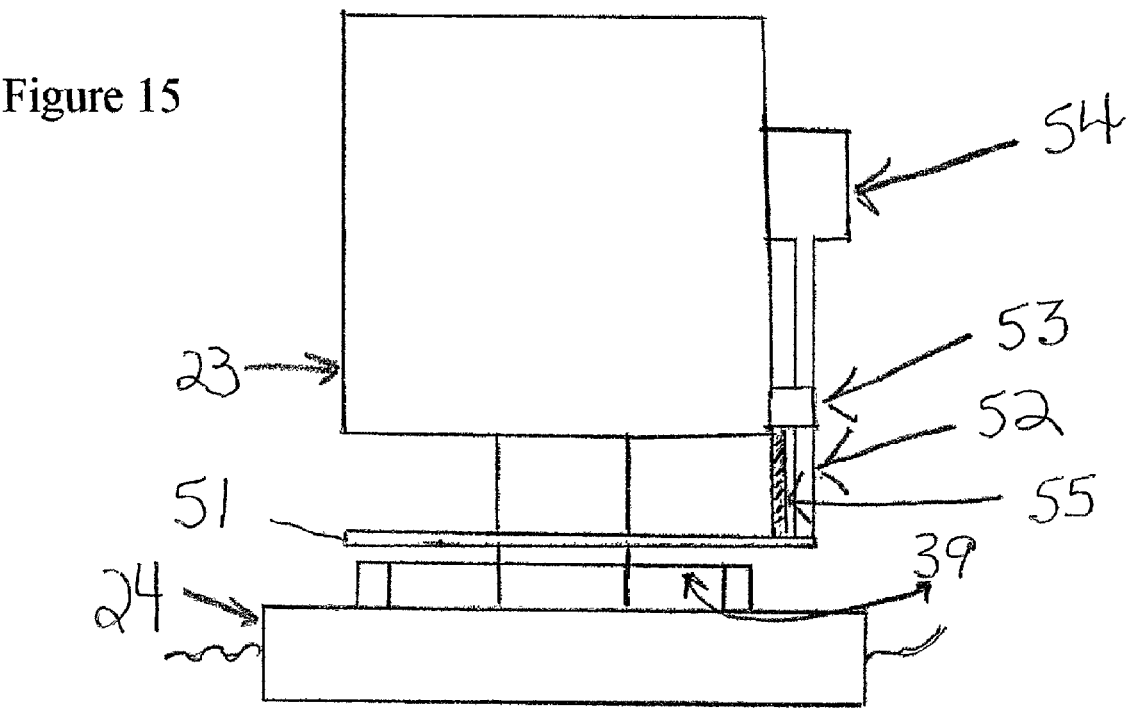
FIG. 15 is a side view of the motorized trimming means of the present invention which includes the capability of remote operation of the self-feeding head.
Figure 16:
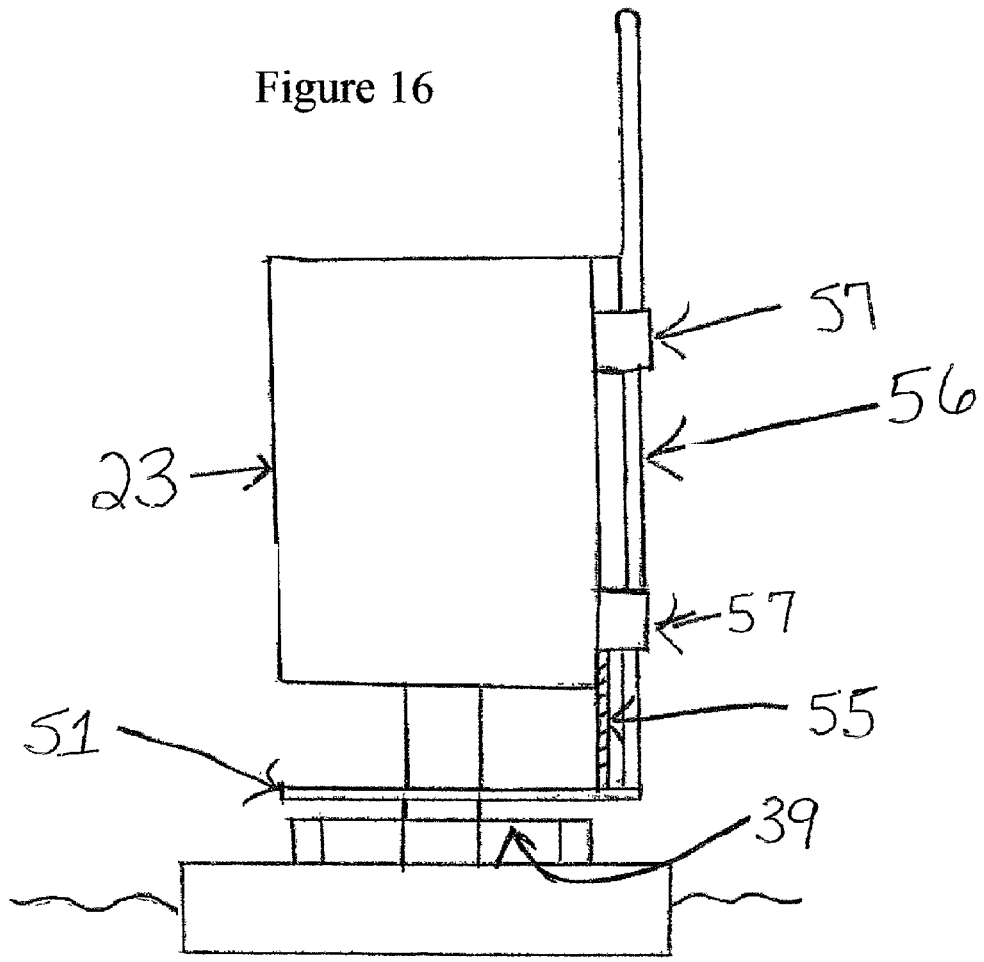
FIG. 16 is a side view of the motorized trimming means of the present invention which includes the capability of manual automatic operation of the feeding head.

The spool 35 is driven by two sets of meshing teeth 42 which are located on the inner surface of the spool housing 34 and the upper surface of the spool 35. In normal operation, the spring 36 biases the spool 35 up such that the sets of teeth 42 mesh. In order to feed additional line, the top ring 39 is struck which in turn forces the spool 35 downward such that the sets of teeth 42 disengage which allows additional line to feed. FIGS. 15 and 16 show mechanisms for accomplishing the line feed remotely.

FIG. 15 shows an apparatus for remotely feeding additional line to the motorized trimming means 24. A striking plate 51 is connected to a shaft 52 which connects to a solenoid 54. A shaft guide 53 guides the support shaft 52. A spring 55 is attached to the striking plate 51 on one end and to the shaft guide 53 on the other end. The purpose of the spring 55 is to keep the striking plate 51 and the top ring 39 from making constant contact while running. Actuating the solenoid 54 causes the striking plate 51 to come into contact with the top ring 39 allowing string to feed out. The solenoid 54 is preferably operated by a switch mounted on the vehicle within easy access of the operator.

FIG. 16 shows another apparatus for remotely feeding additional line to the motorized trimming means 24. A striking plate 51 is connected to a rod 56 which is long enough so that it can be easily reached by the operator. Two rod guides 57 guide the rod 56. A spring 55 is attached to the striking plate 51 on one end and to the lower rod guide 57 on the other end. The purpose of the spring 55 is to keep the striking plate 51 and the top ring 39 from making constant contact while running. To operate the apparatus, the operator strikes the rod 56 with a quick tap and release, which causes the striking plate 51 to come into contact with the top ring 39 allowing string to feed out.

Many improvements, modifications, and additions will be apparent to the skilled artisan without departing from the spirit and scope of the present invention as described herein and defined in the following claims.

What is claimed is:

1. A trimming attachment for a lawn maintenance vehicle, the attachment comprising:
   a frame member which is removably connectable to the lawn maintenance vehicle;
   a pivot arm having first and second ends, the first end of the pivot arm being connected to the frame member at a pivot point;
   a motorized trimming means attached to the second end of the pivot arm;
   means for automatically adjusting the vertical height of the motorized trimming means comprising:
      the pivot arm having first and second portions, the first portion of the pivot arm including the first end of the pivot arm which is connected to the frame member and the second portion of the pivot arm including the second end of the pivot arm to which the motorized trimming means is attached;
      the first portion of the pivot arm being attached to the second portion of the pivot arm by a pivoting connection such that the second portion of the pivot arm is allowed to move in the vertical direction;
      the pivoting connection comprising:
         two vertical members, one of which is attached to the first portion of the pivot arm and one of which is attached to the second portion of the pivot arm; and
         an upper set of pivot members and a lower set of pivot members;
         the lower set of pivot members being pivotally connected at their ends to the vertical members of the first and second portions of the pivot arm;
         the upper set of pivot members each being pivotally connected at one end to the vertical member attached to the second portion of the pivot arm and being pivotally connected at a point along the length of each upper pivot member to the vertical member attached to the first portion of the pivot arm;
         the upper and lower set of pivot members being connected to the vertical members such that the pivot members are substantially parallel to each other; and
         the upper set of pivot members extending beyond the vertical member attached to the first portion of the pivot arm and being connected to a counterbalance means; and
   a control lever connected to the pivot arm between the first and second ends.

2. The trimming attachment as set forth in claim 1 wherein the upper set of pivot members are connected to each other by a plate.

3. The trimming attachment as set forth in claim 1 wherein the counterbalance means is an adjustable spring.

* * * * *